(No Model.)
D. L. M. McINTYRE.
PEDAL.
No. 598,325. Patented Feb. 1, 1898.
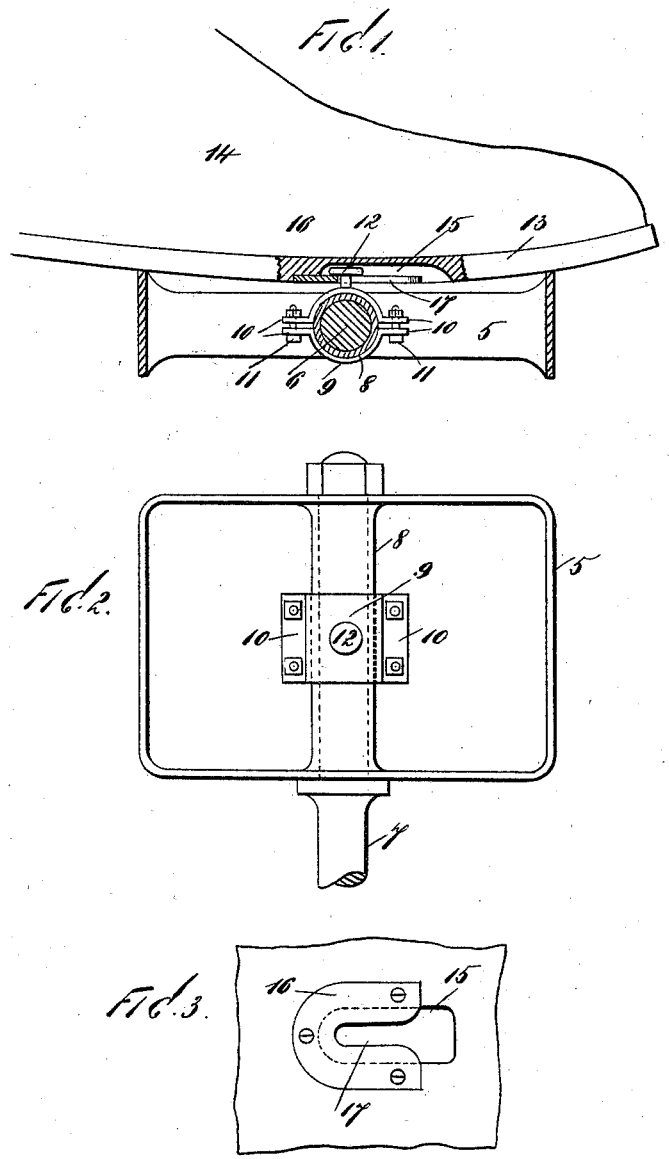

UNITED STATES PATENT OFFICE.

DONALD LOUIS MONTGOMERY McINTYRE, OF NEW YORK, N. Y.

PEDAL.

SPECIFICATION forming part of Letters Patent No. 598,325, dated February 1, 1898.

Application filed April 15, 1897. Serial No. 632,303. (No model.)

*To all whom it may concern:*

Be it known that I, DONALD LOUIS MONTGOMERY McINTYRE, a citizen of the Dominion of Canada, residing at New York, in the county of New York and State of New York, have invented certain new and useful Improvements in Pedals for Bicycles, of which the following is a full and complete specification, such as will enable those skilled in the art to which it appertains to make and use the same.

This invention relates to attachments for the pedals of bicycles and similar vehicles; and the object thereof is to provide an improved device of this class which is adapted to take the place of a toe-clip and which is designed to hold the foot upon the pedal.

The invention is fully disclosed in the following specification, of which the accompanying drawings form a part, in which the separate parts of my improvement are designated by the same numerals of reference in each of the views, and in which—

Figure 1 is a sectional side view of a pedal and also a part of a shoe resting thereon and showing my improvement and the method of its operation; Fig. 2, a plan view of the pedal; Fig. 3, a plan view of a portion of the bottom of a shoe, and Fig. 4 a sectional view showing a modified form of construction.

In the drawings forming part of this specification I have shown at 5 an ordinary pedal such as is employed in connection with bicycles and similar vehicles, and at 6 the shaft on which the pedal is mounted, said shaft being connected with the arm 7 of the pedal-crank in the usual manner, and the shaft 6 passes through a tubular sleeve 8, which forms a part of the pedal, and in the practice of my invention I mount on the sleeve 8, centrally thereof, a clamp or pin 9, which is composed of two separate parts, each of which is provided at its opposite sides with jaws 10, through which is passed a bolt 11, and the upper side of this clamp is provided with a headed pin 12, and I also form in the bottom of the sole 13 of the shoe 14 and centrally thereof a chamber 15, over which is secured a metal plate 16, which covers one end thereof and which is provided with a central slot or opening 17, which opens forwardly or in the direction of the toe of the shoe, and the operation will be readily understood from the foregoing description when taken in connection with the accompanying drawings and the following statement thereof.

In practice the foot is placed upon the pedal in the usual manner, and in said position the headed pin 12 will enter the slot 17 in the plate 6, and the said headed pin is free to move in the chamber 15, formed in the sole of the shoe, and by sliding the foot forwardly the headed pin will engage with the side walls of the slot or opening 17 in the plate 6 and hold the foot in connection with the pedal.

The pedal is free to revolve on the shaft 6 in the usual manner, and in Fig. 4 I have shown a modification in which the headed pin 12 is secured to the sleeve 8, the clamp 9 being omitted.

This device is simple in construction and operation and is perfectly adapted to accomplish the result for which it is intended, while being also comparatively inexpensive.

Having fully described my invention, I claim as new and desire to secure by Letters Patent—

1. The combination with the central transverse sleeve of the pedal of a bicycle or similar vehicle, through which the shaft of the pedal-crank passes, of a headed pin secured thereto, and a slotted plate which is adapted to be connected with the sole of the shoe, substantially as shown and described.

2. The combination with the central transverse sleeve of a pedal for bicycles or similar vehicles, through which the shaft of the pedal-crank passes, of a clamp secured to said sleeve and provided with a headed pin, and a slotted plate which is adapted to be secured to the sole of a shoe, substantially as shown and described.

3. The herein-described device for holding a shoe in connection with the pedal of a bicycle or similar vehicle, said device consisting of a headed pin secured to the central tubular sleeve of the pedal through which the shaft of the pedal-crank passes, and a plate adapted to be secured to the sole of the shoe, and projecting over a recess formed in the sole thereof, said plate being U-shaped and provided with a central longitudinal slot, which opens upon one end of said plate, the said opening being enlarged, and the said slot being mounted directly over the said recess formed in the soles, substantially as and for the purpose described.

In testimony that I claim the foregoing as my invention I have signed my name, in presence of the subscribing witnesses, this 14th day of April, 1897.

DONALD LOUIS MONTGOMERY McINTYRE.

Witnesses:
 C. GERST,
 T. M. CARR.